US009905256B1

(12) United States Patent
Asakura

(10) Patent No.: US 9,905,256 B1
(45) Date of Patent: Feb. 27, 2018

(54) MAGNETIC DISC APPARATUS

(71) Applicant: Kabushiki Kaisha Toshiba, Minato-ku, Tokyo (JP)

(72) Inventor: Makoto Asakura, Bunkyo Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/654,790

(22) Filed: Jul. 20, 2017

(30) Foreign Application Priority Data

Mar. 16, 2017 (JP) ................................ 2017-051805

(51) Int. Cl.
*G11B 5/596* (2006.01)
*G11B 5/55* (2006.01)
*G11B 20/12* (2006.01)

(52) U.S. Cl.
CPC .......... *G11B 5/5547* (2013.01); *G11B 5/5543* (2013.01); *G11B 5/59655* (2013.01); *G11B 5/59688* (2013.01); *G11B 20/1258* (2013.01); *G11B 5/59638* (2013.01); *G11B 20/1217* (2013.01); *G11B 2020/1282* (2013.01)

(58) Field of Classification Search
None
See application file for complete search history.

(56) References Cited

U.S. PATENT DOCUMENTS

| 5,600,506 | A | * | 2/1997 | Baum | G11B 21/081 360/48 |
| --- | --- | --- | --- | --- | --- |
| 5,844,744 | A | * | 12/1998 | Suzuki | G11B 5/553 360/78.04 |
| 8,116,023 | B1 | * | 2/2012 | Kupferman | G11B 5/59655 360/48 |
| 8,213,106 | B1 | * | 7/2012 | Guo | G11B 5/59688 360/29 |
| 8,995,075 | B1 | * | 3/2015 | Chang | G11B 5/5586 360/55 |
| 9,070,411 | B1 | * | 6/2015 | Ellis | G11B 5/59661 |
| 9,384,768 | B1 | * | 7/2016 | Asakura | G11B 5/5526 |
| 2003/0067709 | A1 | * | 4/2003 | Ozawa | G11B 5/5556 360/77.02 |
| 2003/0197964 | A1 | | 10/2003 | Ashikaga et al. | |
| 2007/0064325 | A1 | | 3/2007 | Bi et al. | |
| 2014/0300991 | A1 | * | 10/2014 | Asakura | G11B 5/5547 360/78.08 |
| 2016/0180873 | A1 | * | 6/2016 | Asakura | G11B 5/5526 360/77.07 |

* cited by examiner

*Primary Examiner* — Peter Vincent Agustin
(74) *Attorney, Agent, or Firm* — White & Case LLP

(57) ABSTRACT

According to one embodiment, servo patterns different in servo pattern frequency are recorded in zones divided in a radial direction on a magnetic disc, and the servo patterns in the adjacent zones overlap each other in a predetermined area from a zone servo boundary between the zones, and a determination boundary where it is determined to execute a crossing process is set within the overlapping area of the servo patterns upstream from the zone servo boundary, based on position information on a seek destination and the present position of the magnetic head.

20 Claims, 12 Drawing Sheets

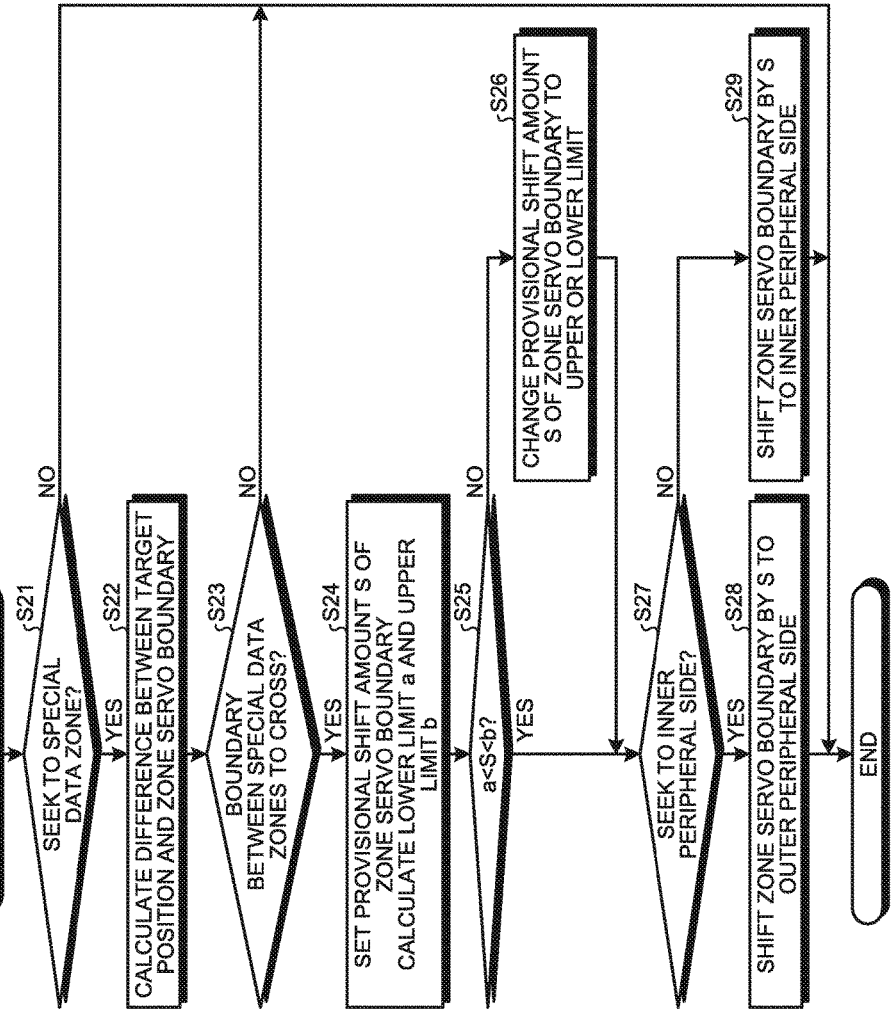
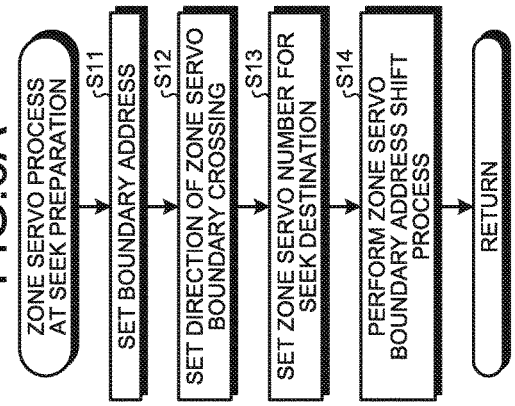

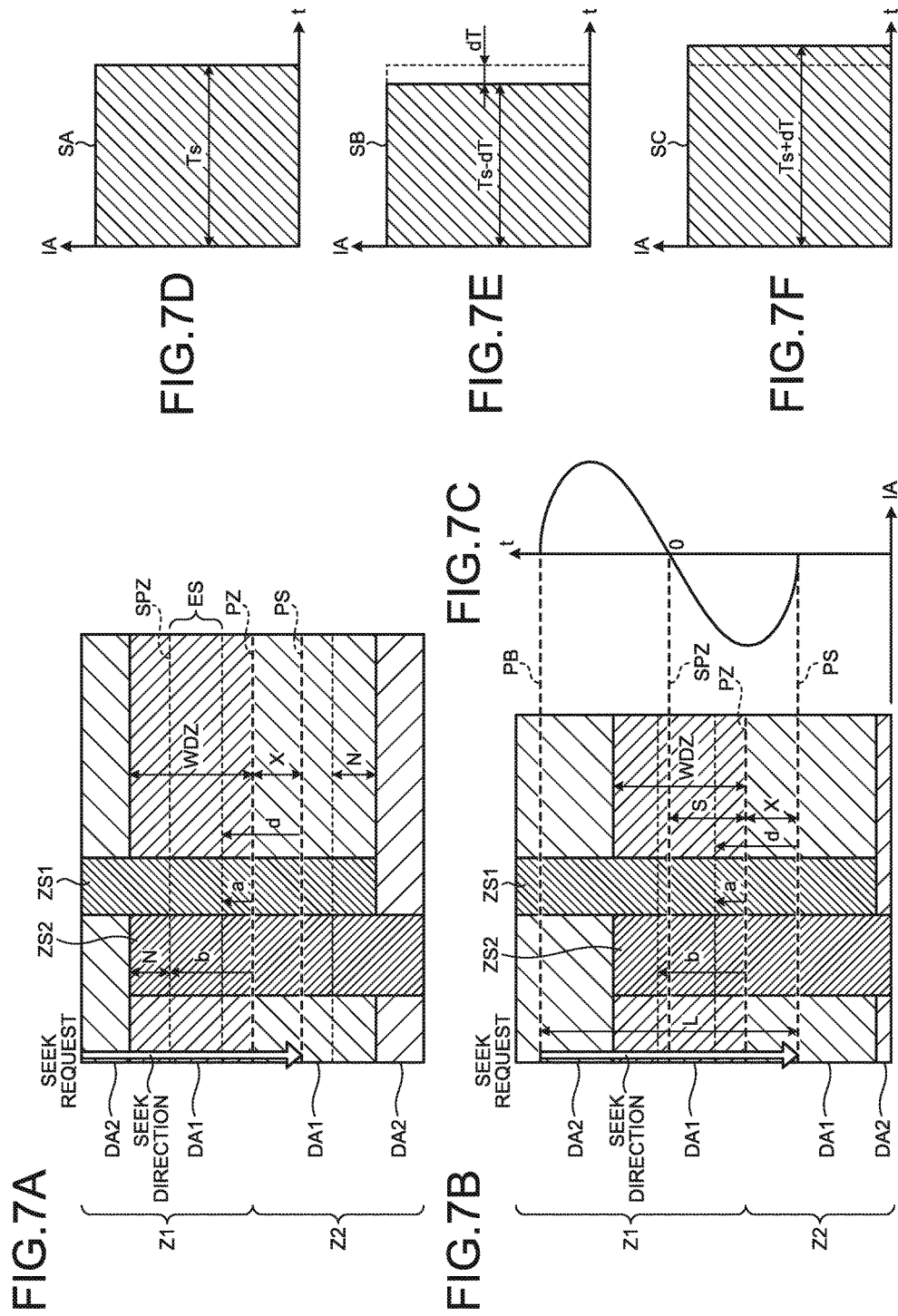

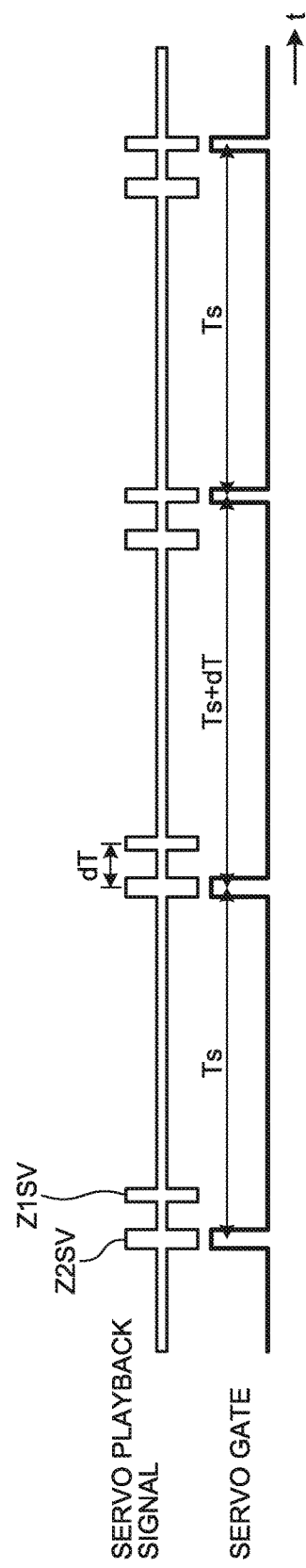

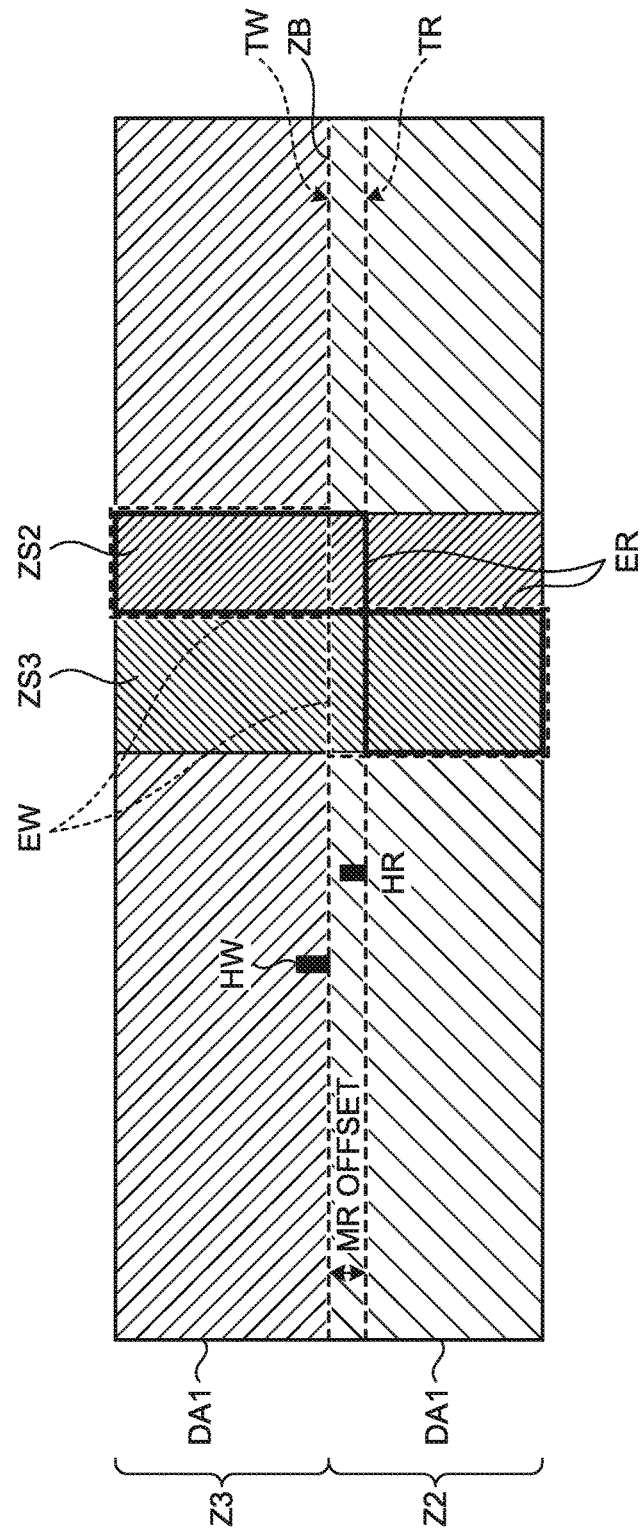

MAGNETIC DISC APPARATUS

CROSS-REFERENCE TO RELATED APPLICATIONS

This application is based upon and claims the benefit of priority from Japanese Patent Application No. 2017-51805, filed on Mar. 16, 2017; the entire contents of which are incorporated herein by reference.

FIELD

Embodiments described herein relate generally to a magnetic disc apparatus.

BACKGROUND

There is a method for increasing a data area into which user data is written in a magnetic disc apparatus by which a servo pattern is divided into a plurality of zones from the inner periphery to outer periphery of a magnetic disc and the write frequency (reference frequency) of the servo pattern in the outer periphery zone is higher than that in the inner periphery zone (zone servo method).

In the zone servo method, an invalid area of a predetermined width into which no user data is written is provided near the zone servo boundary to ensure that the servo patterns can be reliably changed between the zones.

BRIEF DESCRIPTION OF THE DRAWINGS

FIG. 6A is a flowchart of a zone servo initialization process at the time of seek preparation according to a first embodiment, and FIG. 6B is a flowchart of a zone servo boundary address shift process described in FIG. 6A;

FIGS. 7A and 7B are diagrams describing methods for setting a determination position where it is determined whether to execute a crossing process according to the first embodiment, FIG. 7C is a diagram illustrating a VCM current waveform during feedforward control, and FIGS. 7D to 7F are diagrams illustrating fluctuations in the amount of acceleration of a magnetic head caused by a VCM current;

FIG. 8 is a timing chart of delay time in a control period during zone servo boundary crossing;

FIG. 9 is a plane view illustrating the relationship between MR offset and servo playback sections at the time of writing and reading;

DETAILED DESCRIPTION

In general, according to one embodiment, a magnetic disc apparatus includes a magnetic disc, a magnetic head, a determination unit, and a setting unit. The magnetic disc has servo patterns different in servo pattern frequency recorded in zones divided in a radial direction. The servo patterns in the adjacent zones overlap each other in a predetermined area from a zone servo boundary between the zones. The magnetic head is provided for the magnetic disc. The determination unit determines whether to execute a process of crossing the zone servo boundary. The setting unit sets a determination boundary where it is determined to execute the crossing process within the overlapping area of the servo patterns upstream from the zone servo boundary, based on position information on a seek destination and the present position of the magnetic head.

Exemplary embodiments of a magnetic disc apparatus and a zone servo boundary crossing process will be explained below in detail with reference to the accompanying drawings. The present invention is not limited to the following embodiments.

First Embodiment

Figure 1:
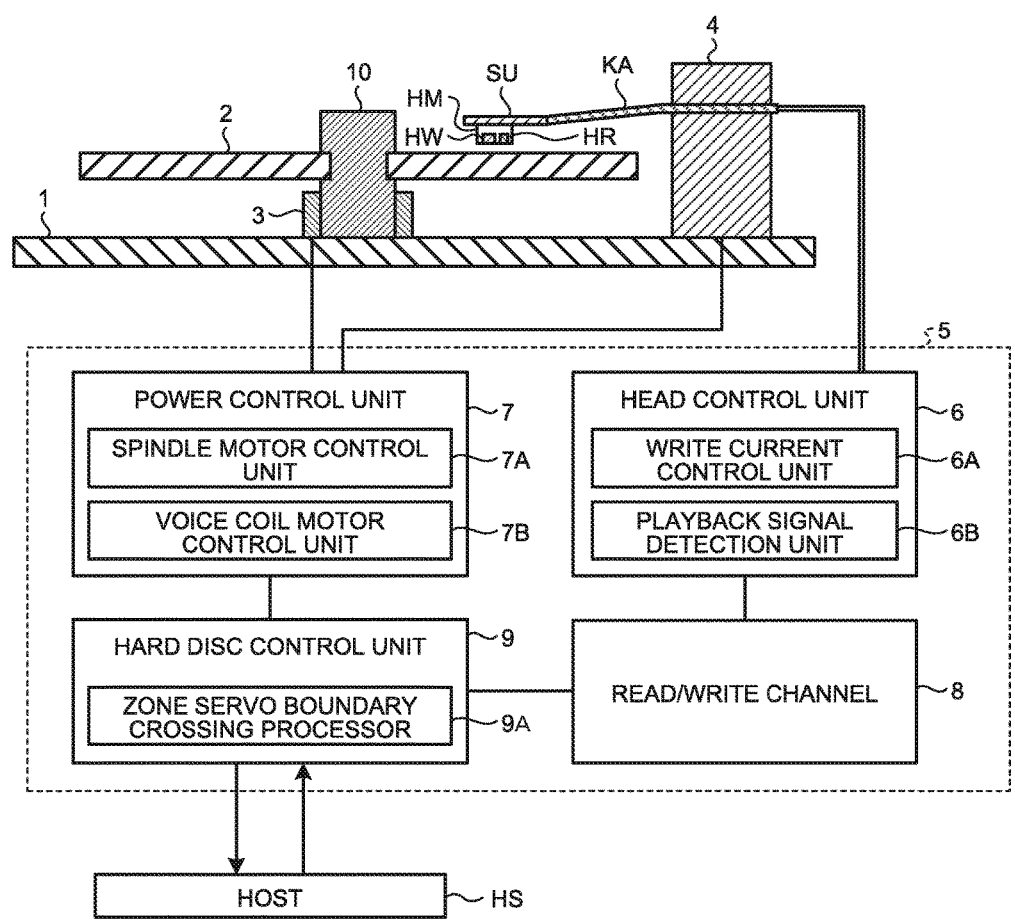
FIG. 1 is a schematic block diagram of a magnetic disc apparatus according to a first embodiment.

FIG. 1 is a schematic block diagram of a magnetic disc apparatus according to a first embodiment.

Referring to FIG. 1, the magnetic disc apparatus has a magnetic disc 2 that is supported by a base 1 via a spindle 10.

Figure 2A:
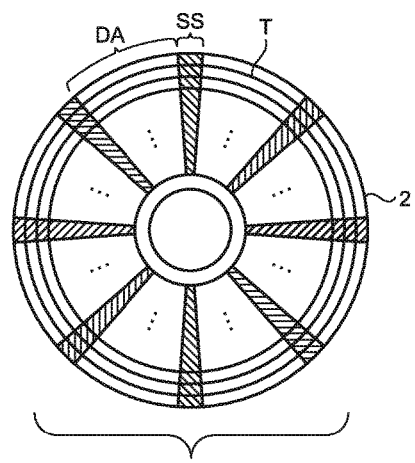
FIG. 2A is a plane view of track layout in a magnetic disc illustrated in FIG. 1.
Figure 2B:
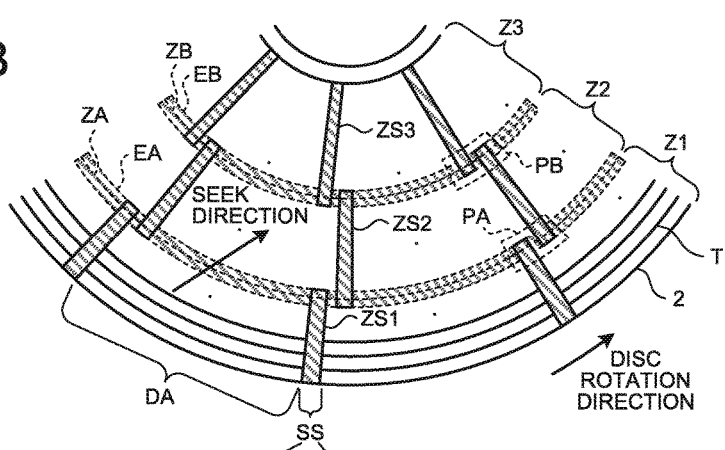
FIG. 2B is a diagram illustrating a method for zone dividing in servo areas.
Figure 2C:
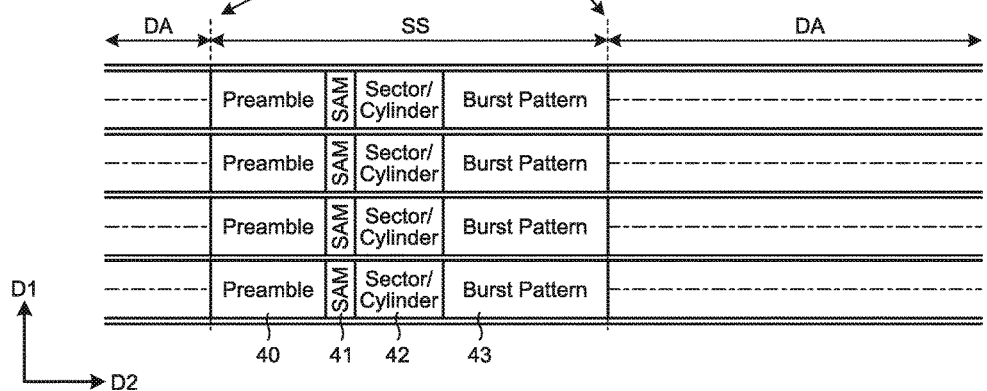
FIG. 2C is a diagram illustrating a configuration example of the servo area illustrated in FIG. 2B.

FIG. 2A is a plane view of track arrangement in the magnetic disc illustrated in FIG. 1, FIG. 2B is a diagram illustrating a configuration of zones in which servo patterns are arranged, and FIG. 2C is a diagram illustrating a configuration example of servo areas illustrated in FIG. 2B. FIG. 2B illustrates an example in which the disc is divided into three zones by the zone servo method.

Referring to FIGS. 2A to 2C, tracks T are provided along a circumferential direction D2. The tracks T each have data areas DA into which user data is to be written and servo areas SS in which servo data is written. In this example, the servo areas SS are radially arranged and the data areas DA are arranged between the servo areas SS along the circumferential direction D2.

As illustrated in FIG. 2B, the magnetic disc 2 is divided into zones Z1 to Z3 in a radial direction D1. In the servo areas SS, servo patterns ZS1 to ZS3 different in servo pattern frequency are respectively arranged in the zones Z1 to Z3, and the servo patterns ZS1 to ZS3 are shifted from each other in the circumferential direction D2.

In this case, the servo pattern frequency can be higher in the outer peripheral zone Z1 than in the inner peripheral zone Z2. For example, the servo pattern frequency can be set to 200 MHz in the zone Z1, the servo pattern frequency can be set to 150 MHz in the zone Z2, and the servo pattern frequency can be set to 100 MHz in the zone Z3. By setting the servo pattern frequency to be higher on the outer peripheral side than the inner peripheral side, it is possible to reduce the spaces for the servo patterns ZS1 to ZS3 and increase the data areas DA as compared to the case where the servo pattern frequency is set as be constant in the zones Z1 to Z3.

The servo patterns ZS1 and ZS2 are arranged in such a manner that their ends overlap with a gap therebetween, and the servo patterns ZS2 and ZS3 are arranged in such a manner that their ends overlap with a gap therebetween. In this case, by providing an overlap section EA between the servo patterns ZS1 and ZS2 and an overlap section EB between the servo patterns ZS2 and ZS3, it is possible to prevent the servo patterns ZS1 to ZS3 from not being detected after switching among the servo patterns ZS1 to ZS3 even with an error in the timing for switching among the servo patterns ZS1 to ZS3. This allows correct servo processing.

A zone servo boundary ZA is provided near the track overlapping the zones Z1 and Z2, and a zone servo boundary ZB is provided near the track overlapping the zones Z2 and Z3.

As illustrated in FIG. 2C, the servo areas SS each have a preamble 40, a servo area mark 41, sector/cylinder information (gray code) 42, and a burst pattern 43. The sector/cylinder information 42 can give servo addresses of the magnetic disc 2 in the circumferential direction D2 and the radial direction D1, which can be used for seek control under which the magnetic head is moved to a target track. The burst pattern 43 can be used for tracking control under which the magnetic head is positioned within the range of a target track. The burst pattern 43 may be a null-type burst pattern, an area-type burst pattern, or a phase difference-type pattern.

Figure 3A:
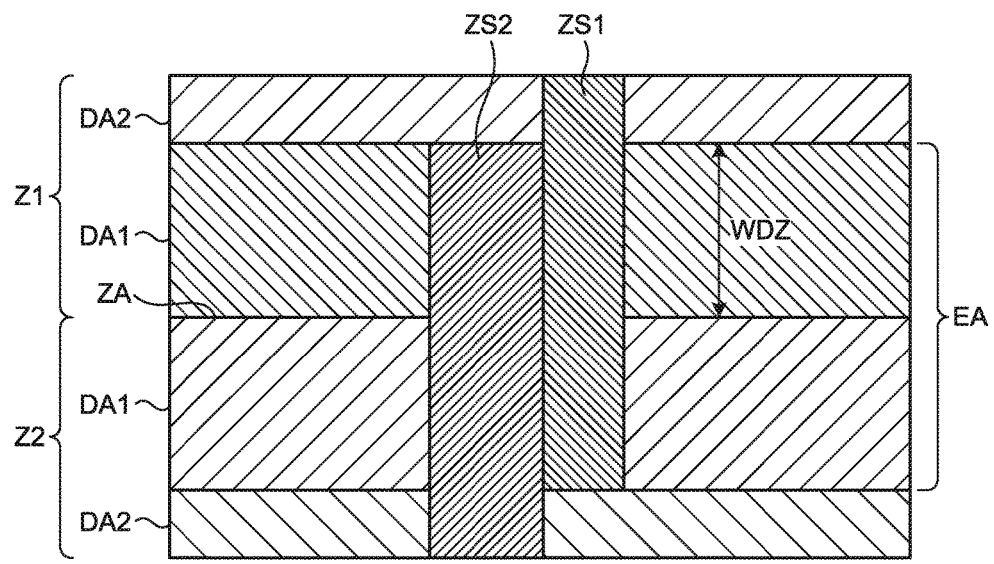
FIG. 3A is an enlarged plane view of a portion PA illustrated in FIG. 2B.
Figure 3B:
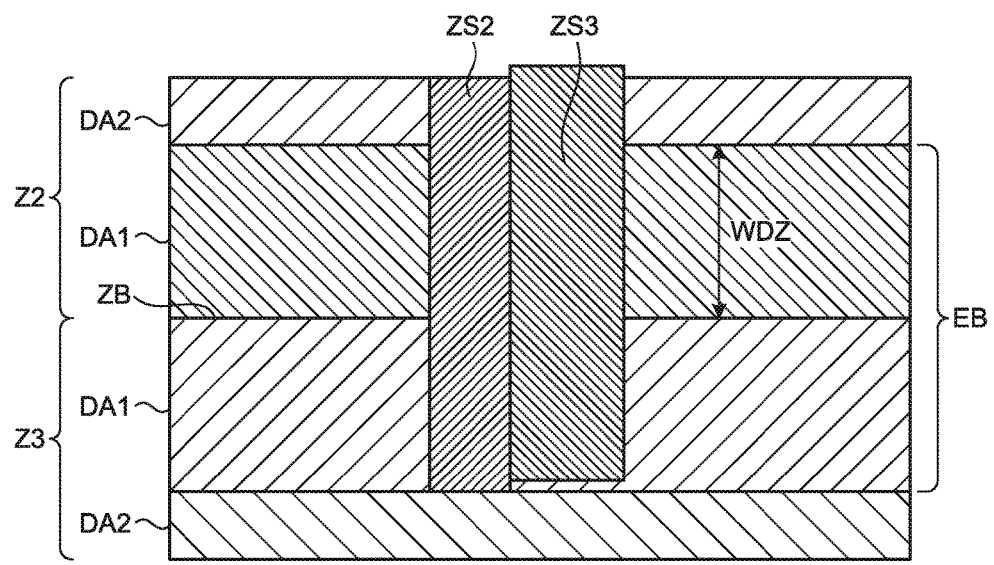
FIG. 3B is an enlarged plane view of a portion PB illustrated in FIG. 2B.

FIG. 3A is an enlarged plane view of a portion PA illustrated in FIG. 2B, and FIG. 3B is an enlarged plane view of a portion PB illustrated in FIG. 2B.

Referring to FIGS. 3A and 3B, the data area DA includes special data areas DA1 and normal data areas DA2. The special data areas DA1 in the zones Z2 and Z3 can be in contact with the zone servo boundary ZB, and the special data areas DA1 in the zones Z1 and Z2 can be in contact with the zone servo boundary ZA. The normal data areas DA2 can be in contact with the special data areas DA1 without contact with the zone servo boundaries ZA and ZB. A width WDZ of the special data areas DA1 can be larger than a write width in which the servo patterns ZS1 to ZS3 disappear at the time of writing into the data areas DA. For example, the width WDZ of the special data areas DA1 can be set to 100 μm.

In the special data areas DA1 of the zones Z2 and Z3, the servo patterns ZS2 and ZS3 can be arranged in an overlapping state. In the special data areas DA1 of the zones Z1 and Z2, the servo patterns ZS1 and ZS2 can be arranged in an overlapping state.

The number of tracks in the special data areas DA1 can be made smaller than the number of tracks in the normal data areas DA2. In addition, the format efficiency in the special data areas DA1 can be made lower than the format efficiency in the normal data areas DA2. Further, in the normal data areas DA2, data reading and writing are enabled after a lapse of a time specified at a servo gate. Meanwhile, in the special data areas DA1, data reading and writing are enabled after a lapse of a predetermined time lagging behind the time specified at the servo gate. The servo gate is a control signal that specifies the timings for generating the servo patterns ZS1 to ZS3.

Referring to FIG. 1, the magnetic disc apparatus has a head slider HM. The head slider HM has a write head HW and a read head HR as magnetic heads. The write head HW and the read head HR are opposed to the magnetic disc 2. The head slider HM is held over the magnetic disc 2 via a suspension SU and a carriage arm KA. The carriage arm KA is slidable on the head slider HM in a horizontal plane at a seek. The suspension SU applies a pressing force to the magnetic head against the floating force of the magnetic head resulting from an air flow with the rotation of the magnetic disc 2, thereby to keep constant the floating amount of the magnetic head over the magnetic disc 2. The suspension SU can be formed from a plate spring.

The magnetic disc apparatus also has a voice coil motor 4 that drives the carriage arm KA and a spindle motor 3 that rotates the magnetic disc 2 around the spindle 10. The voice coil motor 4 and the spindle motor 3 are fixed to the base 1.

The magnetic disc apparatus also has a control unit 5 that controls the operations of the magnetic disc apparatus. The control unit 5 can control the positions of the write head HW and the read head HR with respect to the magnetic disc 2 based on the servo data read by the read head HR. The control unit 5 has a head control unit 6, a power control unit 7, a read/write channel 8, and a hard disc control unit 9.

The head control unit 6 has a write current control unit 6A and a playback signal detection unit 6B. The power control unit 7 has a spindle motor control unit 7A and a voice coil motor control unit 7B.

The head control unit 6 amplifies or detects a signal at the time of recording and replaying. The write current control unit 6A controls a write current flowing through the write head HW. The playback signal detection unit 6B detects the signal read by the read head HR.

The power control unit 7 drives the voice coil motor 4 and the spindle motor 3. The spindle motor control unit 7A controls the rotation of the spindle motor 3. The voice coil motor control unit 7B controls driving of the voice coil motor 4. In this case, the voice coil motor control unit 7B can control a voice coil motor (VCM) current flowing into the coil in the voice coil motor 4.

The read/write channel 8 passes data between the head control unit 6 and the hard disc control unit 9. The data includes read data, write data, and servo data. For example, the read/write channel 8 converts the signal to be replayed by the read head HR into a data format that can be handled by a host HS or converts the data output from the host HS into a signal format that can be recorded on the write head HW. The format conversion includes DA conversion, encoding, AD conversion, and decoding. The read/write channel 8 also decodes the signal replayed by the read head HR and subjects the data output from the host HS to code modulation.

The hard disc control unit 9 controls recording and replaying under instructions from the outside of the magnetic disc apparatus (for example, the host HS) and passes data between the outside and the read/write channel 8. The hard disc control unit 9 has a zone servo boundary crossing processor 9A.

The zone servo boundary crossing processor 9A can determine whether to execute a crossing process over the zone servo boundaries ZA and ZB. In this case, the zone servo boundary crossing processor 9A can set a determination boundary where it is determined whether to execute a crossing process over the zone servo boundaries ZA and ZB within the overlapping sections between the servo patterns ZS1 to ZS3 upstream from the zone servo boundaries ZA and ZB, based on the positional information on the seek destination and the present position of the magnetic head.

When determining that the magnetic head will cross the zone servo boundaries ZA and ZB, the zone servo boundary crossing processor 9A can execute a crossing process over the zone servo boundaries ZA and ZB. The crossing process over the zone servo boundaries ZA and ZB includes making a request for changing the servo frequency and a request for changing the servo gate generation timing, for example. The process performed by the zone servo boundary crossing processor 9A can be implemented by firmware executed on the CPU.

The hard disc control unit 9 may have separately a processor that controls recording and replaying and a processor that controls passing of data between the host HS and the read/write channel 8. Alternatively, the same processor may be used for recording and replaying control and data passage control. The processor can be a CPU.

The control unit 5 is connected to the host HS. The host HS may be a personal computer that issues a write command and a read command to the magnetic disc apparatus or a network connectable to a server or the like. That is, the magnetic disc apparatus can be used as an external storage apparatus for the host HS. The magnetic disc apparatus may be externally attached to the host HS or may be built in the host HS.

While the spindle motor 3 rotates the magnetic disc 2, the magnetic head reads a signal from the magnetic disc 2 and the playback signal detection unit 6B detects the signal. The read/write channel 8 subjects the signal detected by the playback signal detection unit 6B to data conversion and sends the same to the hard disc control unit 9. The hard disc control unit 9 performs tracking control on the magnetic head based on the burst pattern 43 included in the signal detected by the playback signal detection unit 6B.

The present position of the magnetic head is calculated based on the sector/cylinder information 42 included in the signal detected by the playback signal detection unit 6B, and the magnetic head is brought into a seek control to come closer to the target position. When the magnetic head is under the seek control, the zone servo boundary crossing processor 9A determines whether the magnetic head will cross the zone servo boundaries ZA and ZB. In this case, the zone servo boundary crossing processor 9A sets a determination boundary where it is determined whether to execute a crossing process over the zone servo boundaries ZA and ZB upstream from the zone servo boundaries ZA and ZB, based on the positional information on the seek destination and the present position of the magnetic head. This determination boundary is set within the overlapping sections between the servo patterns ZS1 to ZS3.

When determining that the magnetic head will cross the zone servo boundaries ZA and ZB, the zone servo boundary crossing processor 9A changes the servo frequency and the servo gate generation timing in correspondence to the crossed zones Z1 to Z3.

Figure 4:
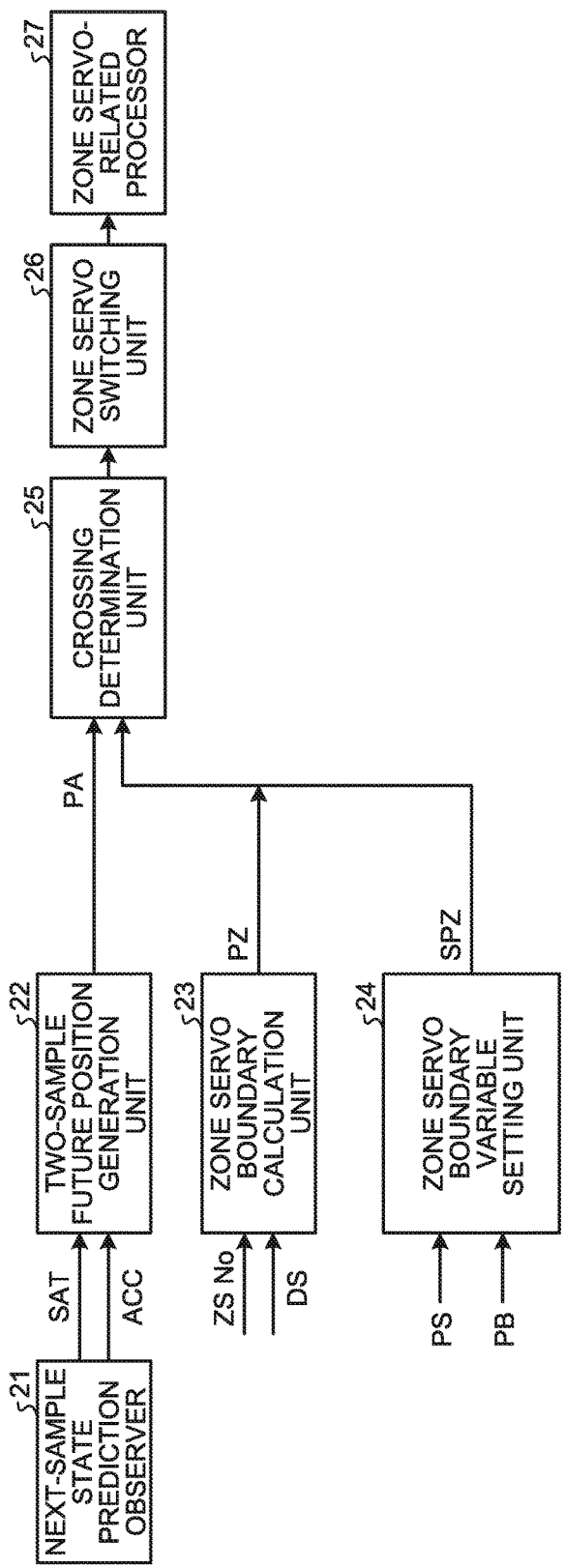
FIG. 4 is a block diagram of a configuration example of a zone servo boundary crossing processor illustrated in FIG. 1.

FIG. 4 is a block diagram of a configuration example of the zone servo boundary crossing processor illustrated in FIG. 1.

Referring to FIG. 4, the zone servo boundary crossing processor 9A includes a next-sample state prediction observer 21, a two-sample future position generation unit 22, a zone servo boundary calculation unit 23, a zone servo boundary variable setting unit 24, a crossing determination unit 25, a zone servo switching unit 26, and a zone servo-related processor 27.

The next-sample state prediction observer 21 predicts the state of the magnetic head on the next sample. The two-sample future position generation unit 22 calculates a predicted position PA two samples later based on an estimated motion state SAT and a present sample acceleration ACC.

The zone servo boundary calculation unit 23 calculates a zone servo boundary PZ based on a seek direction DS and a present servo pattern No. The zone servo boundary variable setting unit 24 sets a determination boundary SPZ where it is determined whether to execute a crossing process upstream from the zone servo boundary PZ, based on a target position PS of the seek destination and a present position PB of the magnetic head. In this case, the determination boundary SPZ is set within the overlapping sections between the servo patterns ZS1 to ZS3.

In the case of a seek to the special data area DA1, the crossing determination unit 25 determines whether to execute a crossing process over the zone servo boundary PZ, based on the predicted position PA and the determination boundary SPZ. In the case of a seek to the normal data area DA2, the crossing determination unit 25 determines whether to execute a crossing process over the zone servo boundary PZ based on the predicted position PA and the zone servo boundary PZ. When it is determined that the magnetic head is to cross over the determination boundary SPZ or the zone servo boundary PZ, the zone servo switching unit 26 executes a crossing process over the zone servo boundary PZ. The zone servo-related processor 27 executes a process relating to a crossing process over the zone servo boundary PZ.

Then, the next-sample state prediction observer 21 calculates the estimated motion state SAT and the present sample acceleration ACC of the magnetic head. The estimated motion state SAT can be regarded as the next-sample estimated position and next-sample estimated velocity of the magnetic head. Then, the two-sample future position generation unit 22 calculates the predicted position PA based on the estimated motion state SAT and the present sample acceleration ACC, and outputs the same to the crossing determination unit 25.

In the case of a seek to the normal data area DA2, the zone servo boundary calculation unit 23 calculates the zone servo boundary PZ based on the seek direction DS and a present servo pattern number ZnSvNo (the number indicating in which zone the servo pattern is being replayed), and outputs the same to the crossing determination unit 25. In the case of a seek to the special data area DA1, the zone servo boundary variable setting unit 24 sets the determination boundary SPZ upstream from the zone servo boundary PZ based on the target position PS of the seek destination and the present position PB of the magnetic head, and outputs the same to the crossing determination unit 25.

In the case of a seek to the normal data area DA2, the crossing determination unit 25 compares the predicted position PA to the zone servo boundary PZ to determine whether the predicted position PA will cross the zone servo boundary PZ. In the case of a seek to the special data area DA1, the crossing determination unit 25 compares the predicted position PA to the determination boundary SPZ to determine whether the predicted position PA will cross the determination boundary SPZ. Then, when the crossing determination unit 25 determines that the predicted position PA will cross the zone servo boundary PZ or the determination boundary SPZ, the zone servo switching unit 26 executes a crossing process over the zone servo boundary PZ. In addition, the zone servo-related processor 27 executes a process relating to the crossing process over the zone servo boundary PZ.

In the case of a seek to the special data area DA1, by setting the determination boundary SPZ upstream from the zone servo boundary PZ based on the target position PS of the seek destination and the present position PB of the magnetic head, it is possible to prevent execution of a zone servo boundary crossing process near the zone servo boundaries ZA and ZB. Accordingly, it is possible to prevent increase in seek setting time or fluctuations in seek setting position near the zone servo boundaries ZA and ZB resulting from a zone servo boundary crossing process, and improve the accessibility to the special data areas DA1 near the zone servo boundaries ZA and ZB.

Figure 5:
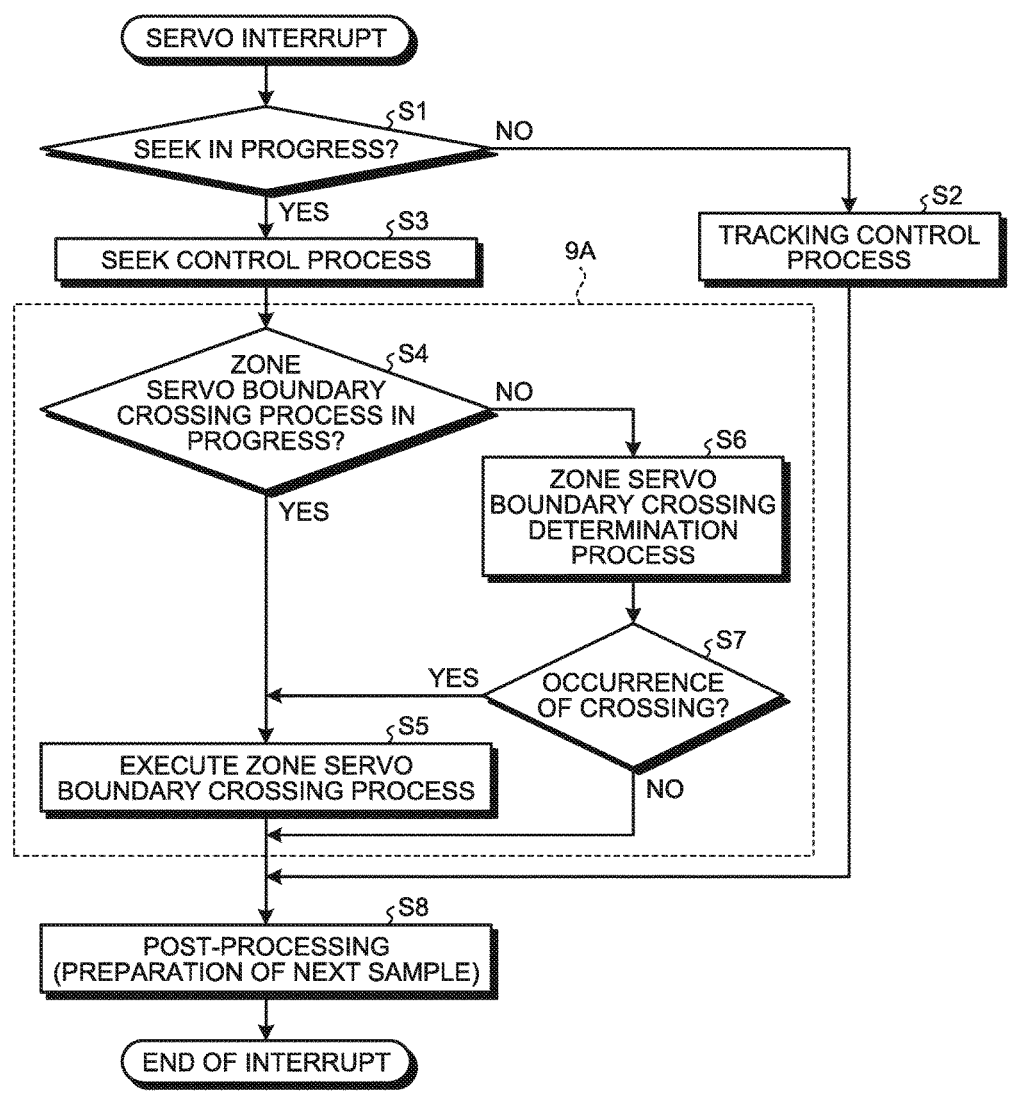
FIG. 5 is a flowchart of a servo interrupt process.

FIG. 5 is a flowchart of a servo interrupt process according to the first embodiment.

Referring to FIG. 5, it is determined whether the hard disc control unit 9 illustrated in FIG. 1 is performing a seek (S1). When it is not determined that the hard disc control unit 9 is performing a seek (No at S1), a tracking control process is performed (S2), and then the processing moves to post-processing such as preparation for the next sample (S8). Meanwhile, when it is determined that the hard disc control unit 9 is performing a seek (Yes at S1), a seek control process is performed (S3). During the seek control process, it is determined whether the zone servo boundary crossing processor 9A is performing a zone servo crossing process (S4). When it is determined that the zone servo boundary crossing processor 9A is performing the zone servo boundary crossing process (Yes at S4), the zone servo boundary crossing processor 9A completes the zone servo boundary crossing process is performed (S5), and the processing moves to post-processing such as preparation for the next sample (S8). In the zone servo boundary crossing process, the hard disc control unit 9 issues a request for provisional change in servo gate generation timing (hereinafter, called provisional change request). The provisional change request is intended to request for changing the timing for generation of a servo gate.

However, the hard disc control unit 9 has already started timing management for the next servo gate and thus the provisional change request is put on hold. Then, upon detection of a servo address mark (SAM) at the next servo gate, the provisional change request is accepted.

Next, when starting a servo process in this servo frame, the hard disc control unit 9 issues a request for servo clock switching to the read/write channel 8. The servo clock switching request is intended to request for changing the frequency of the servo clock. Upon receipt of the switching request, the read/write channel 8 switches from a servo clock replaying a servo signal in the pre-crossing zone to a servo clock replaying a servo signal in the post-crossing zone.

At that time, the hard disc control unit 9 can perform a clock count process with respect to the servo clock generated by the read/write channel 8 to manage the servo gate generation timing.

Next, a request for changing servo gate generation timing management information (hereinafter, called management information change request) is issued. The management information change request is intended to request for changing management information on servo gate generation timing. In this case, a temporary count value at the time of crossing with a mixture of two servo clocks is changed to a proper count value at the time of generation of a servo gate for the zone.

The management information change request is put on hold as the provisional change request, and is accepted upon detection of SAM at the servo gate section in the post-crossing zone. Then, the management information change request put on hold becomes effective at the servo gate generation timing after the crossing.

In the zone servo boundary crossing process, changing the filter band change, changing the initial value of servo variable gain amp (SVGA), stopping a partial power down (PPD) process, and changing PowerSave timing, and others can be performed.

After that, when it is confirmed that the zone servo boundary crossing has succeeded, the zone servo boundary process in progress is canceled and the next zone servo boundary crossing determination process is started again. Meanwhile, when no zone servo boundary crossing process is being performed (No at S4), a zone servo boundary crossing determination process is performed (S6). In the zone servo boundary crossing determination process, it is determined on each sample whether the magnetic head will cross a zone servo boundary two samples after. Upon completion of the zone servo boundary crossing determination process, it is determined whether the magnetic head has crossed a zone servo boundary (S7). When the magnetic head has crossed a zone servo boundary (Yes at S7), a zone servo boundary crossing process is performed (S5). Meanwhile, when the magnetic head has not crossed a zone servo boundary (No at S7), the processing moves to post-processing such as preparation for the next sample (S8).

When the present position ZnSvNo of the magnetic head is at the final ZnSvNo of the target seek destination, no zone servo boundary crossing determination may be performed in order to eliminate unnecessary zone servo boundary crossing determination.

In three-zone dividing, there are the two zone servo boundaries ZA and ZB, and the target zone servo boundary for crossing determination can be selected based on the seek direction DS and the present position ZnSvNo of the magnetic head.

Specifically, when ZnSvNo in the zones Z1 to Z3 are respectively 1 to 3, no zone servo boundary crossing determination is performed in the case of ZnSvNo=1 and RvsSeek (a seek to the outer periphery side) and in the case of ZnSvNo=3 and FwdSeek (a seek to the inner periphery side).

In the case of ZnSvNo=1 and FwdSeek and the case of ZnSvNo=2 and RvsSeek, the target zone servo boundary for crossing determination is ZA, but no zone servo boundary crossing determination may be necessarily executed.

In the case of ZnSvNo=2 and FwdSeek and the case of ZnSvNo=3 and RvsSeek, the target zone servo boundary for crossing determination is ZB, but no zone servo boundary crossing determination may be necessarily executed.

The determination boundary where it is determined whether to execute a crossing process over the zone servo boundaries ZA and ZB can be the determination boundary SPZ shifted upstream from the zone servo boundaries ZA and ZB. In this case, the zone servo boundary crossing processor 9A executes the process described in FIG. 5 at each servo interrupt in the seek control process (S3). In contrast to this, the determination boundary SPZ can be set at seek preparation executed immediately after receipt of a seek request.

A method for setting the determination boundary SPZ will be described below in detail.

FIG. 6A is a flowchart of a zone servo initialization process at the time of seek preparation according to the first embodiment, and FIG. 6B is a flowchart of a zone servo boundary address shift process described in FIG. 6A.

Referring to FIG. 6A, when the zone servo initialization process is started, the zone servo boundary address is set (S11). In the setting of the zone servo boundary address, it is decided at what radial position the start of the zone servo boundary crossing is to be determined.

In this case, the radial position is set with reference to the zone servo boundary address preset in the present head. The zone servo boundary address may be any address almost in the center of the special data area DA1, and may be determined from initial fixed addresses equivalent to the zone servo boundaries ZA and ZB illustrated in FIG. 2B or the data zone boundary addresses in the special data areas DA1.

In this case, it is possible to set the true zone servo boundary including an off-track amount with an allowance for differences in cylinder shift among the heads and the seek type of read seek or write seek. Specifically, at start of the drive, the zone servo boundary addresses specified by optimization parameters specific to the individual drives can be converted into servo addresses for use in seek control and the converted values can be stored for the zone servo boundaries ZA and ZB in the memory for all the heads. In addition, an MR offset at this radial position can be stored in the memory for all the heads. The MR offset is a radial gap between the write head HW and the read head HR. At the time of seek preparation, the values stored in the memory are referred to and developed to the addresses of the zone servo boundaries ZA and ZB for the magnetic head at the seek. In a read seek, the MR offset to a write seek is added.

Next, the direction of zone servo boundary crossing is set (S12). In the setting of the direction of zone servo boundary crossing, the seek direction is decided from the present position of the magnetic head and the target position of the magnetic head. In this case, FwdSeek or RvsSeek can be set.

Next, the zone servo number for the seek destination is set (S13). In this case, the target position of the seek destination is compared to the true zone servo boundary to determine within what range the target position falls and set the zone servo number for the seek destination. However, when the data zone information on the seek destination is available, it is easier to determine the zone servo number for the seek destination from the data zone information on the seek destination. Accordingly, the zone servo number for the seek destination can be set based on the data zone information on the seek destination.

Setting in advance the zone number for the seek destination makes it possible to omit the zone servo crossing determination called in each servo period as far as the zone servo number for the present position is equal to the zone servo number for the seek destination. In addition, setting in advance the zone servo number for the seek destination prevents frequent occurrence of zone servo switching due to overshooting or the like at the seek. Either the setting of the direction of zone servo boundary crossing or the setting of the zone servo number for the seek destination may come first.

Next, a zone servo boundary address shift process is performed (S14). In the zone servo boundary address shift process, the determination boundary SPZ where it is determined whether to execute a crossing process is set upstream from the zone servo boundary PZ based on the target position PS of the seek destination and the present position PB of the magnetic head.

Specifically, referring to FIG. 6B, the data zone number for the seek destination is referred to determine whether the seek destination is a special data zone adjacent to a zone servo boundary (S21). When the seek destination is not a special data zone, the process is terminated without shifting the preset zone servo boundary. When the seek destination is a special data zone, the difference between the target position of the seek destination and the zone servo boundary is determined based on the address of the zone servo boundary in the special data zone (S22).

Next, it is determined whether the magnetic head will cross a zone servo boundary between special data zones during movement from the present position to the seek destination (S23). When the magnetic head will not cross a zone servo boundary, the process is terminated. When the magnetic head will cross a zone servo boundary, a provisional shift amount S, a lower limit value a, and an upper limit value b of the zone servo boundary are calculated (S24).

When the distance from the zone servo boundary PZ to the target position PS of the seek destination is designated as X, the provisional shift amount S, the lower limit value a, and the upper limit value b can be given by Equations (1) to (3) as follows:

$$S=L/2-X \tag{1}$$

$$a=d-X \tag{2}$$

$$b=WDZ-N \tag{3}$$

where
d represents the distance not affecting the setting properties at the seek;
L represents the movement distance of the magnetic head during the seek;
N represents the write width with which the servo pattern disappears at the time of writing the data area; and
WDZ represents the width of the zone adjacent to the zone servo boundary.

In this case, the distance X from the zone servo boundary PZ to the target position PS of the seek destination can be given by Equation (4) as follows:

$$X=(PS-PZ)*[(FwdSeek==1)*2-1] \tag{4}$$

where (FwdSeek==1) is 1 in the case of FwdSeek and 0 in the case of RvsSeek.

FIGS. 7A and 7B are diagrams describing methods for setting a determination position where it is determined whether to execute a crossing process according to the first embodiment, FIG. 7C is a diagram illustrating a VCM current waveform under feedforward control, and FIGS. 7D to 7F are diagrams illustrating fluctuations in the amount of acceleration of the magnetic head caused by a VCM current. FIG. 7A illustrates the case of a long-distance seek and FIG. 7B illustrates the case of a short-distance seek.

Referring to FIG. 7A, a request for a seek from the zone Z1 to the zone Z2 is made when the magnetic head is distant from the special data areas DA1. In this case, when the provisional shift amount S in Equation (1) is greater than the upper limit value b, the provisional shift amount S is set to the upper limit value b in Equation (3). Then, the position shifted by the upper limit value b from the zone servo boundary PZ can be set to the determination boundary SPZ.

Referring to FIG. 7B, a request for a seek from the zone Z1 to the zone Z2 is made when the present position PB of the magnetic head is in the zone Z1. When the target position PS of the seek destination is within a distance d from the zone servo boundary PZ and the magnetic head is determined to cross the zone servo boundary PZ, the position shifted by the provisional shift amount S=L/2-X from the zone servo boundary PZ can be set to the determination boundary SPZ. The zone servo boundary PZ illustrated in FIGS. 7A and 7B is the zone servo boundary ZA illustrated in FIG. 2B.

As illustrated in FIG. 7C, the determination boundary SPZ shifted upstream from the zone servo boundary PZ can be set to the position returned by ½ of the movement distance L at the seek from the target position PS of the seek destination. At that time, the VCM current IA is almost 0 at the determination boundary SPZ. By setting the determination boundary SPZ at the position where the VCM current IA is almost 0, it is possible to reduce fluctuations in the seek setting position even when there is a delay time dT in a control period Ts from the sample point immediately before the boundary crossing to the sample point immediately after the boundary crossing.

FIG. 8 is a timing chart of a delay time in a control period during zone servo boundary crossing.

Referring to FIG. 8, for example, there is the delay time dT between a servo playback signal Z1SV in the zone Z1 and a servo playback signal Z2SV in the zone Z2. Accordingly, when a sample control is controlled in the control period Ts in the seek control system, the control period Ts fluctuates by the delay time dT at the time of switching between the zones Z1 and Z2. In this case, in the zone servo boundary crossing process, the servo gate timing is also changed. Therefore, the control period becomes Ts+dT when switching takes place from the present servo playback signal Z2SV to the servo playback signal Z1SV on the phase-lagged side. In contrast, although not illustrated, the control period becomes Ts−dT when switching takes place from the present servo playback signal Z1SV to the servo playback signal Z2SV on the phase-lead side.

As illustrated in FIG. 7B, when the present position PB of the magnetic head falls within the normal data area DA2 adjacent to the special data area DA1 and the magnetic head seeks to the special data area DA1 proximate to the zone servo boundary PZ, the magnetic head may cross the zone servo boundary PZ. In such a short-distance seek, the VCM current IA illustrated in FIG. 7C is set under feedforward control.

Under the feedforward control, as illustrated in FIG. 7D, the VCM current IA is set such that a target acceleration amount SA can be obtained in the control period Ts.

Meanwhile, in the case of switching to the servo pattern on the phase-lead side, as illustrated in FIG. 7E, an acceleration amount SB lesser than the target acceleration amount SA by an amount corresponding to the delay time dT is obtained to cause fluctuations in the seek setting position.

In addition, in the case of switching to the servo pattern on the phase-lagged side, as illustrated in FIG. 7F, an acceleration amount SC greater than the target acceleration amount SA by the acceleration amount corresponding to the delay time dT is obtained to cause fluctuations in the seek setting position.

As illustrated in FIG. 7C, under feedforward control in a short-distance seek, it can be regarded that switching between acceleration and deceleration takes place at the point of almost ½ of the movement distance at the seek. The VCM current IA is almost 0 at the point of almost ½ of the movement distance at the seek. When the VCM current IA is almost 0, errors in acceleration and deceleration due to unexpected dT*VCM current are minor to an extend that they can be ignored. That is, setting the determination boundary SPZ at a position where the VCM current IA is expected to be almost 0 makes it possible to reduce fluctuations in the seek setting position.

In an ultrashort-distance seek of 10 tracks or less, the magnetic head crosses the zone servo boundary PZ in the special data area DA1. At that time, the provisional shift amount S is under the lower limit value a, and the determination boundary SPZ is set on the outer side than the present position of the magnetic head. In this case, the zone servo crossing determination condition is already satisfied, and a zone servo crossing process is started at the first sample point of the start of the seek. That is, the magnetic head performs the zone servo crossing while the feedforward current is close to 0, thereby to prevent degradation in setting properties due to current fluctuations.

Referring to FIG. 6, when the provisional shift amount S is calculated at S24 and then the boundary is shifted in excess of the upper limit value b, there is an increasing risk that no servo signal can be found due to deterioration in the SN ratio. Meanwhile, when the boundary is shifted below the lower limit value a, current fluctuations occur due to a control correction error of the delay time dT resulting from strong gain positioning control for pulling in setting, which highly possibly leads to deteriorated setting after the movement to the target position of the seek destination.

Accordingly, it is determined whether the provisional shift amount S falls within a shift range ES of a<S<b (S25). When the provisional shift amount S does not fall within the shift range ES, the provisional shift amount S is changed to the lower limit value a or the upper limit value b as illustrated in FIG. 7A (S26).

Next, it is determined whether to seek to the inner periphery side of the magnetic disc 2 (S27). In the case of a seek to the inner periphery side, the zone servo boundary PZ is shifted to the outer periphery side by the provisional shift amount S (S28). In the case of a seek to the outer periphery side, the zone servo boundary PZ is shifted to the inner periphery side by the provisional shift amount S (S29).

Accordingly, it is possible to implement the zone servo boundary crossing process even in the case of access to the special data zone while preventing degradation in access performance.

Specifically, under a seek control, the magnetic head is moved based on a control system mainly performing velocity control. Then, when the magnetic head becomes close to the target track, the magnetic head is moved based on a control system mainly performing position control. When there are the zone servo boundaries ZA and ZB in the special data area DA1, the magnetic head may seek to the track adjacent to the zone servo boundaries ZA and ZB. In this case, the magnetic head may cross the zone servo boundary in the control state where position control is mainly performed.

In the control system mainly performing velocity control, positional errors resulting from the delay time dT can be slowly corrected. Meanwhile, in the control system mainly performing position control, the rapid correction of position errors resulting from the delay time dT is attempted to cause VCM current fluctuations and increase the seek setting time.

By setting the determination boundary for determining whether to start zone servo boundary crossing at a position where the true zone servo boundary is shifted upstream, it is possible to prevent the situation where the magnetic head crosses the zone servo boundary in the control state mainly for position control and suppress increase in the seek setting time.

FIG. 9 is a plane view illustrating the relationship between MR offset and servo playback sections at the time of writing and reading.

Referring to FIG. 9, there occurs an MR offset between the write head HW and the read head HR depending on the position of the magnetic head. Accordingly, the zone servo boundary for servo playback is TW with the write head HW, and the zone servo boundary for servo play back is TR with the read head HR. In this case, the servo playback section is EW with the write head HW, and the servo playback section is ER with the read head HR. As a result, the true zone servo boundary ZB differs between the write head HW and the read head HR.

By setting the determination boundary SPZ where it is determined whether to execute a crossing process over the zone servo boundaries ZA and ZB upstream from the zone servo boundaries ZA and ZB, it is possible to use the determination boundary SPZ in common between the write head HW and the read head HR.

Second Embodiment

In the first embodiment, the determination boundary for determining whether to start zone servo boundary crossing is set at a position shifted upstream from the true zone servo boundary. This method is effective in seeking to the vicinities of the zone servo boundaries ZA and ZB and crossing the zone servo boundaries ZA and ZB. However, in an ultrashort-distance seek with 10 tracks or less, some presumed acceleration error occurs even when the crossing is executed at the start of the feedforward seek. Accordingly, when the delay time dT is large, performance degradation may occur to some extent.

Accordingly, in a second embodiment, a zone servo boundary crossing process is completed during seek preparation so that a servo signal at the switch destination is already capable of being replayed at the sample point of start of the seek.

In the control state where velocity control is mainly performed, when the magnetic head crosses the zone servo boundary during high-velocity movement, there is no detailed address setting allowing for the off-track amount. Information such as the cylinder number is sufficient. In addition, since the width WDZ of the special data area DA1 is about 100 μm and the determination boundary for determining whether to start zone servo boundary crossing is set at a position shifted upstream from the true zone servo boundary, errors of several tens of tracks would cause no trouble. In a seek within the special data area DA1, the magnetic head is tracking in a dual servo state at the present position. Accordingly, the zone servo boundary crossing can be completed during seek preparation. Therefore, in the second embodiment, a simplified version of a zone servo boundary crossing process to be started during a seek is provided within seek preparation to execute a zone servo boundary crossing process before start of a seek.

Figure 10:
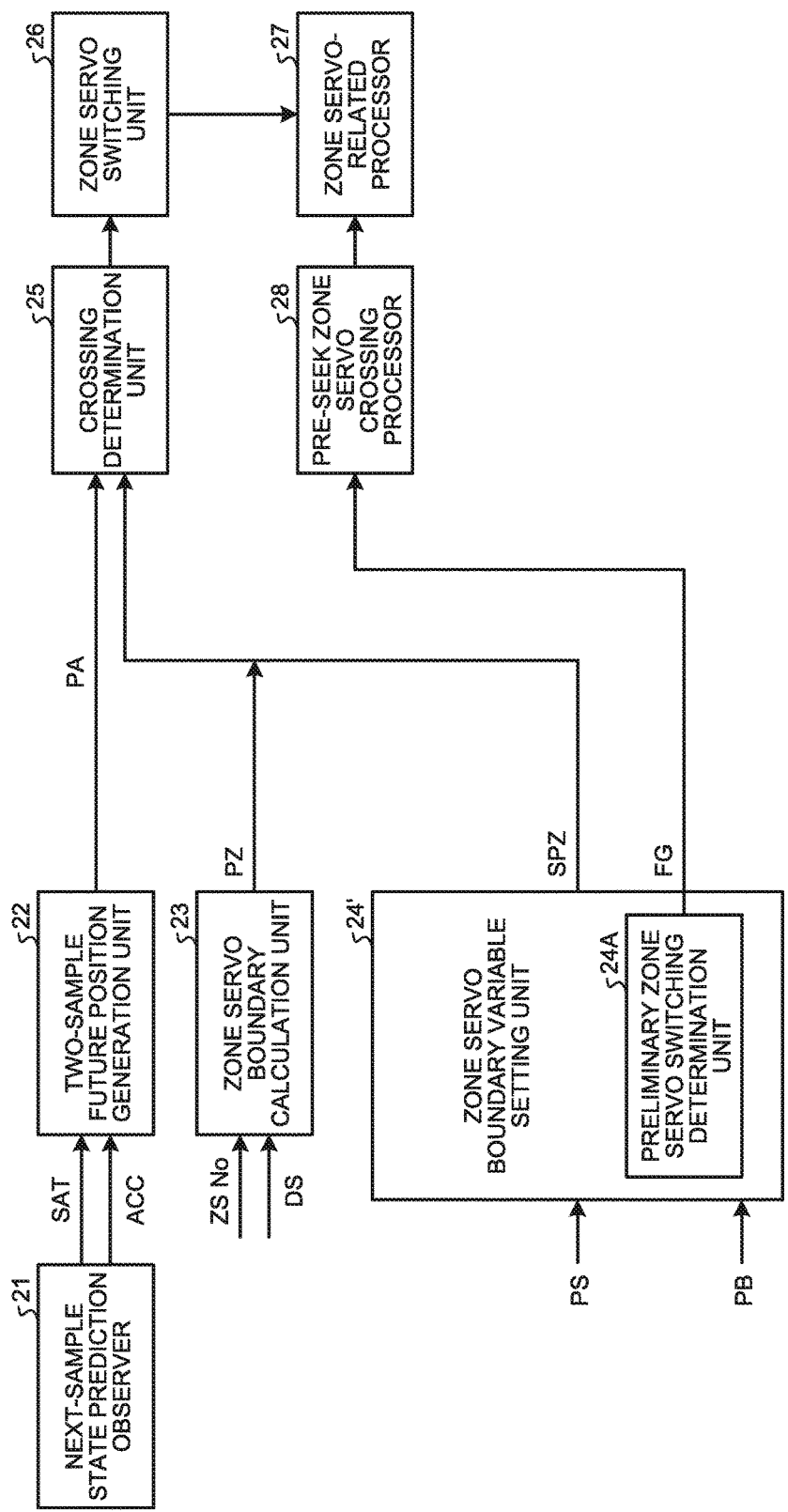
FIG. 10 is a block diagram of a configuration example of a zone servo boundary crossing processor in a magnetic disc apparatus according to a second embodiment.

FIG. 10 is a block diagram of a configuration example of a zone servo boundary crossing processor in a magnetic disc apparatus according to a second embodiment.

In the configuration of FIG. 10, a zone servo boundary variable setting unit 24' is provided instead of the zone servo boundary variable setting unit 24 illustrated in FIG. 4. The zone servo boundary variable setting unit 24' has a preliminary zone servo switching determination unit 24A. In addition, in the configuration of FIG. 10, a pre-seek zone servo crossing processor 28 is added to the configuration of FIG. 4.

The preliminary zone servo switching determination unit 24A can determine whether to start a zone servo boundary crossing process before start of a seek based on the information on the position of the seek destination and the determination boundary SPZ. The pre-seek zone servo crossing processor 28 can start a zone servo crossing process before start of a seek. In this case, the information on the position of the seek destination used for determining whether to start a zone servo boundary crossing process can be the data zone number for the seek destination.

Then, when determining that a zone servo crossing process is to be started before start of a seek, the preliminary zone servo switching determination unit 24A sends a start request flag FG to the pre-seek zone servo crossing processor 28. Upon receipt of the start request flag FG, the pre-seek zone servo crossing processor 28 starts a zone servo crossing process before start of a seek.

The preliminary zone servo switching determination unit 24A may not allow a zone servo boundary crossing process to be performed at the time of an ultrashort-distance seek under feedforward control. This makes it possible to prevent degradation in seek setting performance even in the case of a seek within the special data area DA1.

By using the data zone number for the seek destination for the information on the position of the seek destination used for determining whether to start a zone servo boundary crossing process, it is possible to simplify the setting of the determination boundary SPZ used for determining whether to start a zone servo boundary crossing process.

Figure 11:
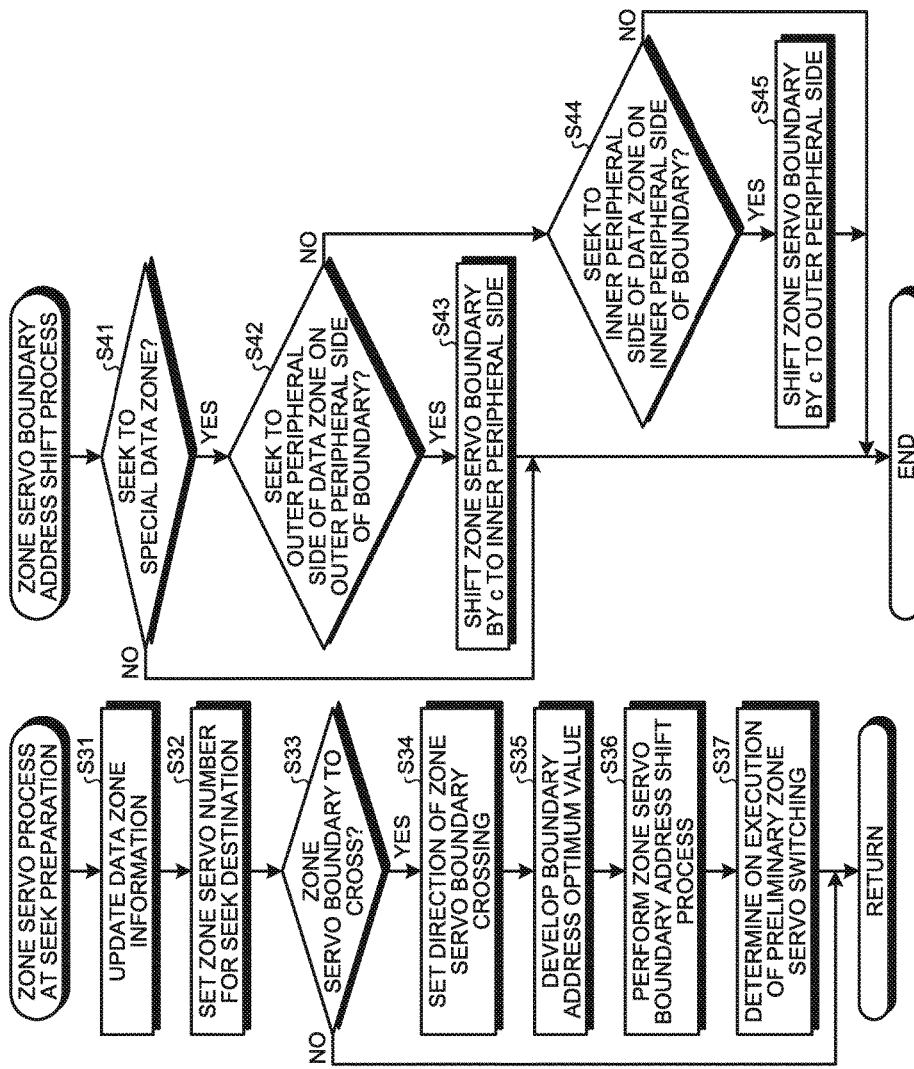
FIG. 11A is a flowchart of a zone servo initialization process at the time of seek preparation according to the second embodiment.
FIG. 11B is a flowchart of a zone servo boundary address shift process described in FIG. 11A.
FIG. 11C is a flowchart of a preliminary zone servo switching execution determination process described in FIG. 11A.

FIG. 11A is a flowchart of a zone servo initialization process at the time of seek preparation according to the second embodiment, FIG. 11B is a flowchart of a zone servo boundary address shift process described in FIG. 11A, and FIG. 11C is a flowchart of a preliminary zone servo switching execution determination process described in FIG. 11A.

Referring to FIG. 11A, when a zone servo process is started at the time of seek preparation, the data zone information is updated (S31). The data zone information includes the data zone number for the present position of the magnetic head and the data zone number for the seek destination. Updating the data zone information makes it possible to manage determination on whether to start a zone servo boundary crossing process by the data zone number.

Next, the zone servo number for the seek destination is set (S32). In this case, the zone servo number for the seek destination is set by comparing the target position of the seek destination to the true zone servo boundary and determining in which range the target position is placed.

Next, the zone servo number for the present position and the zone servo number for the seek destination are compared to each other to determine whether the magnetic head will cross the zone servo boundary (S33). When the zone servo number for the present position and the zone servo number for the seek destination are not equal, it is determined that the magnetic head will cross the zone servo boundary.

Setting in advance the zone servo number for the seek destination makes it possible to omit the determination on the occurrence of zone servo crossing called in each servo period as far as the zone servo number for the present position is equal to the zone servo number for the seek destination.

When the magnetic head will cross the zone servo boundary, the direction of zone servo boundary crossing is set (S34). This setting is only to specify whether the seek is FwdSeek or RvsSeek. Accordingly, the seek direction can be decided by determining the magnitude relationship between the zone servo number for the present position and the zone servo number for the seek destination without having to use the address of the present position of the magnetic head and the address of the target position of the magnetic head at the seek destination.

Next, boundary address optimum values are developed (S35). The development of the boundary address optimum values is intended to set uniformly the expected positions of the zone servo boundaries given by optimization parameters, with disregard to fine address adjustments to each head and seek type of read seek or write seek. The zone servo boundaries given by the optimization parameters are the servo cylinder addresses of the tops of the special data zones which do not coincide with the true zone servo boundaries without reflection of various address adjustments to each head. However, the zone servo boundaries given by the optimization parameters are assured to be addresses of the centers or their neighborhoods of the dual servo sections. Accordingly, the magnetic head can cross the zone servo boundary in a high-velocity seek with sufficient accuracy even by using the expected position of the zone servo boundary given by the optimization parameter.

Next, the zone servo boundary address shift process is carried out (S36). Next, the preliminary zone servo switching execution determination is executed (S37).

Referring to FIG. 11B, in the zone servo boundary address shift process, it is determined whether the seek destination is a special data zone with reference to the data zone number for the seek destination (S41). When the seek destination is not a special data zone, the process is terminated without shifting the true zone servo boundary.

When the seek destination is a special data zone, it is determined whether to seek the magnetic head to the outer peripheral side of the data zone on the outer peripheral side of the zone servo boundary (S42). When the magnetic head is to seek to the outer peripheral side of the data zone on the outer peripheral side of the zone servo boundary, the zone servo boundary PZ is shifted to the inner peripheral side by a shift amount c (S43).

Meanwhile, when the magnetic head is to seek to the inner peripheral side of the data zone on the outer peripheral side of the zone servo boundary, it is then determined whether the magnetic head is to seek to the inner peripheral side of the data zone on the inner peripheral side of the zone servo boundary (S44). When the magnetic head is to seek to the inner peripheral side of the data zone on the inner peripheral side of the zone servo boundary, the zone servo boundary PZ is shifted to the outer peripheral side by the shift amount c (S45).

Referring to FIG. 11C, in the preliminary zone servo switching execution determination, the zone servo number for the present position of the magnetic head is calculated at the present shifted zone servo boundary (S51) In addition, it is determined whether the zone servo number for the present position of the magnetic head coincides with the present shifted zone servo number (S52). When the zone servo number for the present position of the magnetic head coincides with the present shifted zone servo number, the process is terminated. When the zone servo number for the present position of the magnetic head does not coincide with the present shifted zone servo number, the switching destination is set to the present shifted zone servo number and then a request for zone servo switching at the time of seek preparation is made (S53).

In this case, the shift amount c can be given by Equation (5) as follows with the condition d<c<b satisfied:

$$c = b - MGN \quad (5)$$

where MGN represents a fixed value allowing for various servo margins.

Figure 12:
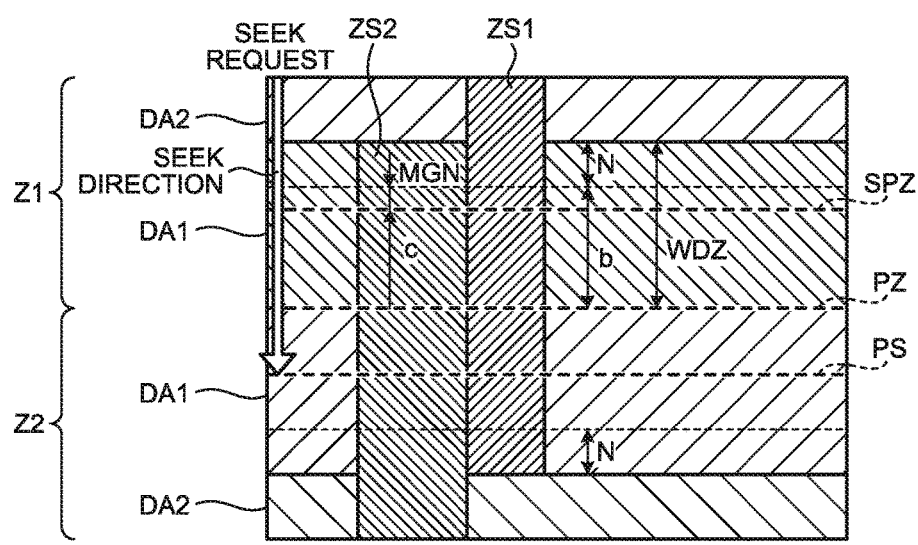
FIG. 12 is a diagram describing a method for setting a determination position where it is determined whether to execute a crossing process according to the second embodiment.

FIG. 12 is a diagram describing a method for setting a determination position where it is determined whether to execute a crossing process according to the second embodiment.

Referring to FIG. 12, the seek destination is within the special data area DA1. When it is determined that the magnetic head will cross the zone servo boundary PZ, the determination boundary SPZ can be set at the position where the zone servo boundary PZ is shifted upstream by the shift amount c.

The shift amount c takes on a fixed value. This reduces the load on a zone servo boundary crossing process.

In addition, in a long seek or the like, the zone servo boundary crossing process can be completed earlier than the timing when the magnetic head crosses the zone servo boundary PZ. Accordingly, even when the seek destination is in the special data area DA1, it is possible to prevent influence of the fluctuations in the VCM current resulting from the zone servo boundary crossing on the degradation of seek setting.

In the second embodiment, the shift amount c is set to a fixed value. Alternatively, the shift method in the first embodiment may be used in combination depending on the seek type and the seek distance.

By shifting the zone servo boundary PZ by the shift amount c as described above, it is possible to avoid occurrence of zone servo boundary crossing in the control state in which the position control system at the seek control termination stage is predominant, and prevent degradation in setting properties at least in a long seek. However, in an ultrashort-distance feedforward seek during which the magnetic head crosses a boundary between special data zones, shifting the zone servo boundary PZ by the shift amount c is not sufficient to prevent degradation in seek setting properties.

Specifically, according to the method by which to shift the zone servo boundary PZ by the shift amount c, the shifted position of the zone servo boundary PZ may be already crossed by the present position of the magnetic head. At that time, the occurrence of zone servo boundary crossing is determined on the first sample at start of the seek, and the zone servo boundary crossing process is started. In this case, the magnetic head crosses the zone servo boundary while the VCM current in the feedforward seek is still near 0, but there may arise a deviation from the expected position at the feed forward driving to lengthen slightly the setting time.

Accordingly, in an ultrashort-distance feed forward seek, a zone servo boundary crossing process is not executed during but is executed at the seek preparation stage. Specifically, when the present position of the magnetic head has already crossed the shifted position of the zone servo boundary PZ, the preliminary zone servo switching determination unit 24A illustrated in FIG. 10 sends the start request flag FG to the pre-seek zone servo crossing processor 28. Upon receipt of the start request flag FG, the pre-seek zone servo crossing processor 28 executes a zone servo boundary crossing process at the seek preparation stage.

In the embodiment described above, the condition for starting the pre-seek zone servo crossing processor 28 is decided from the result of the determination on whether the present position of the magnetic head has already crossed the shifted position of the zone servo boundary PZ. However, the pre-seek zone servo crossing processor 28 can be started in the section where dual servo is assured to enable zone servo switching. Accordingly, any condition for starting the pre-seek zone servo crossing processor 28 other than the determination on whether the present position of the magnetic head has already crossed the shifted position of the zone servo boundary PZ may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disc apparatus comprising:
a magnetic disc in which servo patterns different in servo pattern frequency are recorded in zones divided in a radial direction and the servo patterns in the adjacent zones overlap each other in a predetermined area from a zone servo boundary between the zones;
a magnetic head provided for the magnetic disc;
a determination unit that determines whether to execute a process of crossing over the zone servo boundary; and
a setting unit that sets a determination boundary where it is determined to execute the crossing process within the overlapping area of the servo patterns upstream from the zone servo boundary, based on position information on a seek destination and the present position of the magnetic head.

2. The magnetic disc apparatus of claim 1, wherein
a data area is provided up to a position in contact with the zone servo boundary, and
a distance not affecting setting properties at a seek is designated as d, a movement distance in a seek is designated as L, and a difference between a target position of the seek destination and the zone servo boundary is designated as X, and
when the position of the seek destination is within the distance d from the zone servo boundary and the magnetic head is determined to cross the zone servo boundary, the setting unit shifts the zone servo boundary by a provisional shift amount $S=L/2-X$.

3. The magnetic disc apparatus of claim 2, wherein
in a seek to an inner peripheral side of the magnetic disc, the setting unit shifts the zone servo boundary to an outer peripheral side of the magnetic disc by the provisional shift amount S, and
in a seek to the outer peripheral side of the magnetic disc, the setting unit shifts the zone servo boundary to the inner peripheral side of the magnetic disc by the provisional shift amount S.

4. The magnetic disc apparatus of claim 2, wherein
when the provisional shift amount S does not satisfy relationship $a<S<b$ wherein a is a lower limit value and b is an upper limit value, the provisional shift amount S is changed to the lower limit value a or the upper limit value b, and wherein
the lower limit value a represents $d-X$,
the upper limit value b represents $WDZ-N$,
the N represents a write width with which the servo pattern disappears at the time of writing the data area, and
the WDZ represents a zone width adjacent to the zone servo boundary.

5. The magnetic disc apparatus of claim 1, wherein the setting unit sets the determination boundary to come closer to a position where a voice coil motor (VCM) current becomes 0.

6. The magnetic disc apparatus of claim 5, wherein the VCM current is set under feedforward control at a seek.

7. The magnetic disc apparatus of claim 6, wherein a sample control is performed in a control period under the feedforward control to set the VCM current such that a target acceleration amount at the seek can be obtained in the control period.

8. The magnetic disc apparatus of claim 7, wherein, in an ultrashort-distance seek of 10 tracks or less, a zone servo crossing process is started at a first sample point at start of a seek.

9. The magnetic disc apparatus of claim 1, wherein
position information on the seek destination is a data zone number for the seek destination, and
when a data zone at the seek destination is different from a data zone at the present position of the magnetic head, the setting unit sets the determination boundary upstream from the zone servo boundary.

10. The magnetic disc apparatus of claim 1, comprising data areas provided in the individual zones, wherein
the data areas includes:
a normal data area arranged at a position distant from the zone servo boundary; and
a special data area that is lower in format efficiency than the normal data area and is arranged at a position in contact with the zone servo boundary.

11. The magnetic disc apparatus of claim 10, wherein the servo patterns overlaps in the special data areas.

12. The magnetic disc apparatus of claim 1, wherein
the magnetic head includes a write head and a read head,
the write head and the read head have an offset along a radius of the magnetic disc, and
the determination boundary is set in common between the write head and the read head.

13. The magnetic disc apparatus of claim 1, comprising:
an observer that estimates position and velocity of the magnetic head in a next sample; and
a generation unit that calculates a predicted position of the magnetic head two samples after based on the position and velocity of the magnetic head estimated by the observer, wherein
the determination unit determines whether to execute a crossing process over the zone servo boundary based on the predicted position calculated by the generation unit and the determination boundary set by the setting unit.

14. The magnetic disc apparatus of claim 13, comprising a zone servo switching unit that executes a crossing process over the zone servo boundary based on results of determination by the determination unit, wherein
in the crossing process, switching takes place from a servo clock for replaying a servo signal in a zone before the crossing to a servo clock for replaying a servo signal in a zone after the crossing.

15. The magnetic disc apparatus of claim 13, further comprising a calculation unit that calculates the zone servo boundary based on a seek direction and the present servo pattern number.

16. The magnetic disc apparatus of claim 15, comprising data areas provided in the individual zones, wherein
the data areas includes:
a normal data area arranged at a position distant from the zone servo boundary; and
a special data area that is lower in format efficiency than the normal data area and is arranged at a position in contact with the zone servo boundary,
in a seek to the special data area, the determination unit determines whether to execute a crossing process over the zone servo boundary based on the predicted position calculated by the generation unit and the determination boundary set by the setting unit, and in a seek to the normal data area, the determination unit determines whether to execute a crossing process over the zone servo boundary based on results of comparison between the predicted position calculated by the generation unit and the zone servo boundary calculated by the calculation unit.

17. The magnetic disc apparatus of claim 1, comprising a preliminary switching determination unit that determines whether to start a zone servo boundary crossing process before start of a seek based on the position information on the seek destination and the determination boundary.

18. The magnetic disc apparatus of claim 17, wherein the shift amount for setting the determination boundary upstream from the zone servo boundary takes on a fixed value.

19. The magnetic disc apparatus of claim 17, wherein the position information on the seek destination is a data zone number for the seek destination.

20. The magnetic disc apparatus of claim 17, further comprising a crossing processor that starts a zone servo crossing process before start of the seek.

\* \* \* \* \*